United States Patent
Okunaka et al.

(10) Patent No.: US 11,279,808 B2
(45) Date of Patent: Mar. 22, 2022

(54) THERMOPLASTIC RESIN COMPOSITION, METHOD FOR PRODUCING THERMOPLASTIC RESIN COMPOSITION, AND MOLDED BODY

(71) Applicant: Mitsubishi Chemical Corporation, Tokyo (JP)

(72) Inventors: Osamu Okunaka, Tokyo (JP); Hiroki Ishii, Tokyo (JP); Kazuaki Itou, Tokyo (JP); Shuuji Ishiwata, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 15/943,464

(22) Filed: Apr. 2, 2018

(65) Prior Publication Data

US 2018/0223054 A1 Aug. 9, 2018

Related U.S. Application Data

(63) Continuation of application No. PCT/JP2016/078729, filed on Sep. 28, 2016.

(30) Foreign Application Priority Data

Oct. 16, 2015 (JP) .............................. JP2015-204141

(51) Int. Cl.
| | | |
|---|---|---|
| *C08J 5/04* | (2006.01) | |
| *C08K 3/04* | (2006.01) | |
| *C08K 7/06* | (2006.01) | |
| *C08L 77/00* | (2006.01) | |
| *C08L 101/00* | (2006.01) | |
| *C08L 77/06* | (2006.01) | |

(52) U.S. Cl.
CPC .............. *C08J 5/042* (2013.01); *C08K 3/04* (2013.01); *C08K 7/06* (2013.01); *C08L 77/00* (2013.01); *C08L 77/06* (2013.01); *C08L 101/00* (2013.01); *C08J 2300/22* (2013.01); *C08J 2477/06* (2013.01); *C08K 2201/004* (2013.01)

(58) Field of Classification Search
CPC .... C08J 5/042; C08J 2300/22; C08J 2477/06; C08K 7/06; C08K 3/04; C08K 2201/004; C08L 77/00; C08L 101/00; C08L 77/06; B29C 45/0005; D01F 9/22
See application file for complete search history.

(56) References Cited

U.S. PATENT DOCUMENTS

| | | | | | |
|---|---|---|---|---|---|
| 5,288,537 A | * | 2/1994 | Corden | ................. | B29C 70/885 428/116 |
| 5,470,909 A | * | 11/1995 | Nishii | ................... | C08L 71/126 524/449 |
| 6,121,388 A | * | 9/2000 | Umetsu | ................. | C08K 5/092 525/425 |
| 2008/0071024 A1 | * | 3/2008 | Morishita | ............... | C08L 25/06 525/66 |
| 2009/0043026 A1 | * | 2/2009 | Tanaka | ..................... | C08K 3/34 524/277 |
| 2011/0040007 A1 | | 2/2011 | Chandrasekhar et al. | | |
| 2012/0177937 A1 | * | 7/2012 | Ogawa | ................... | C08G 69/26 428/458 |
| 2012/0322935 A1 | * | 12/2012 | Atarashi | .................. | C08K 3/04 524/496 |
| 2013/0165576 A1 | * | 6/2013 | Shin | ......................... | C08J 5/042 524/495 |
| 2016/0222208 A1 | * | 8/2016 | Park | .................... | C08L 23/0815 |
| 2017/0001336 A1 | * | 1/2017 | Tamai | ...................... | B29B 9/12 |

FOREIGN PATENT DOCUMENTS

| | | |
|---|---|---|
| CN | 101263200 A | 9/2008 |
| CN | 100547030 C | 10/2009 |
| CN | 101993602 A | 3/2011 |
| CN | 102532869 A | 7/2012 |
| CN | 102838804 A | 12/2012 |
| CN | 103068890 A | 4/2013 |
| EP | 0957132 B1 | 9/2004 |
| JP | 2000-095947 A | 4/2000 |
| JP | 2003-049081 A | 2/2003 |
| JP | 2003-327836 A | 11/2003 |
| JP | 2006-265441 A | 10/2006 |
| JP | 2007-327010 A | 12/2007 |
| JP | 2009-185151 A | 8/2009 |
| JP | 2010-143986 A | 7/2010 |
| JP | 5028873 B2 | 9/2012 |

(Continued)

OTHER PUBLICATIONS

Poly(phenylene sulfie) information and properties, p. 1, (2006).*
International Search Report issued in corresponding International Application No. PCT/JP2016/078729 dated Dec. 20, 2016.
Database WPI, Week 200676, Thomson Scientific, London, GB; AN 2006-735223.
Extended European Search Report issued in corresponding European Patent Application No. 16855263.6, dated Aug. 16, 2018.
Korean Office Action dated Sep. 26, 2019 in corresponding Korean Application No. 10-2018-7009966 with English translation.

(Continued)

*Primary Examiner* — Alexander C Kollias
(74) *Attorney, Agent, or Firm* — Morgan, Lewis & Bockius LLP

(57) ABSTRACT

Provided is a thermoplastic resin composition which provides a molded body having excellent thermal conductivity and excellent mechanical characteristics. A thermoplastic resin composition which contains (A) a thermoplastic resin, (B) pitch carbon fibers and (C) graphite, and wherein: the content of the graphite (C) is from 1% by mass to 20% by mass (inclusive) relative to 100% by mass of the thermoplastic resin composition; and a molded body, which is obtained by molding this thermoplastic resin composition and has a thickness of 1 mm, has a thermal conductivity of 10 W/mK or more as determined by a hot wire method.

17 Claims, No Drawings

(56) References Cited

FOREIGN PATENT DOCUMENTS

| JP | 2013-001818 A | 1/2013 |
| JP | 2014-101459 A | 6/2014 |
| JP | 2015-120358 A | 7/2015 |
| WO | 2009/075322 A1 | 6/2009 |

OTHER PUBLICATIONS

Office Action issued in corresponding Japanese Patent Application No. 2016-562604 dated Mar. 24, 2020 with machine translation.
Final Office Action issued in corresponding Korean Patent Application No. 10-2018-7009966 dated Mar. 12, 2020 with machine translation.
Official Action dated Dec. 20, 2019 issued in Chinese Patent Application 201680059420.4.
Office Action issued in corresponding Chinese Patent Application No. 201680059420.4 dated Oct. 10, 2020.
Office Action dated Apr. 2, 2021, issued in corresponding Chinese Patent Application No. 201680059420.4.

* cited by examiner

THERMOPLASTIC RESIN COMPOSITION, METHOD FOR PRODUCING THERMOPLASTIC RESIN COMPOSITION, AND MOLDED BODY

TECHNICAL FIELD

The present invention relates to a thermoplastic resin composition, a method for producing a thermoplastic resin composition, and a molded body.

This application is based upon and claims the benefit of priority of the prior Japanese Patent Application No. 2015-204141 filed in Japan on Oct. 16, 2015, the entire contents of which are incorporated herein by reference.

BACKGROUND ART

It is known to blend a carbon fiber into a thermoplastic resin in order to improve the thermal conductivity and mechanical properties of a molded body obtained by molding the thermoplastic resin.

For example, Patent Literature 1 discloses a thermoplastic resin composition in which a PAN-based carbon fiber and graphite are blended into a thermoplastic resin. In addition, Patent Literatures 2 and 3 disclose a thermoplastic resin composition in which a pitch-based carbon fiber and graphite are blended into a thermoplastic resin. Furthermore, Patent Literature 4 discloses a thermoplastic resin composition in which a pitch-based carbon fiber is blended into a thermoplastic resin.

CITATION LIST

Patent Literature

Patent Literature 1: JP 2000-095947 A
Patent Literature 2: JP 2006-265441 A
Patent Literature 3: JP 2003-049081 A
Patent Literature 4: JP 2015-120358 A

SUMMARY OF THE INVENTION

Problem to be Solved by the Invention

However, the thermoplastic resin composition disclosed in Patent Literature 1 contains only a PAN-based carbon fiber as a carbon fiber and the molded body thereof thus exhibits poor thermal conductivity. In addition, the thermoplastic resin composition disclosed in Patent Literature 2 has a low content rate of a pitch-based carbon fiber and the molded body thereof thus exhibits poor thermal conductivity. In addition, the thermoplastic resin composition disclosed in Patent Literature 3 has a high content rate of graphite and it thus exhibits poor moldability. Furthermore, the thermoplastic resin composition disclosed in Patent Literature 4 does not contain graphite and the molded body thereof thus exhibits poor thermal conductivity.

Means For Solving Problem

[1] A thermoplastic resin composition containing a thermoplastic resin (A), a pitch-based carbon fiber (B), and graphite (C), in which a content rate of the pitch-based carbon fiber (B) is 30% by mass or more in 100% by mass of the thermoplastic resin composition and a content rate of the graphite (C) is 1% by mass or more and 20% by mass or less in 100% by mass of the thermoplastic resin composition.

[2] The thermoplastic resin composition described in [1], in which the content rate of the graphite (C) is 2% by mass or more and 12% by mass or less in 100% by mass of the thermoplastic resin composition.

[3] The thermoplastic resin composition described in [1] or [2], in which a mass average fiber length of the pitch-based carbon fiber (B) in the thermoplastic resin composition is 0.1 mm or longer and 0.3 mm or shorter.

[4] The thermoplastic resin composition described in any one of [1] to [3], in which a thermal conductivity of the pitch-based carbon fiber (B) is 400 W/mK or less.

[5] The thermoplastic resin composition described in any one of [1] to [4], in which the thermoplastic resin (A) is a polyamide resin.

[6] The thermoplastic resin composition described in [5], in which the polyamide resin is poly(m-xylene adipamide).

[7] The thermoplastic resin composition described in any one of [1] to [6], further containing a PAN-based carbon fiber (D).

[8] The thermoplastic resin composition described in any one of [1] to [7], in which a thermal conductivity of a molded body which is obtained by molding the thermoplastic resin composition and has a thickness of 1 mm measured by a hot wire method is 10 W/mK or more.

[9] The thermoplastic resin composition described in any one of [1] to [8], in which a tensile strength of a molded body obtained by molding the thermoplastic resin composition measured in conformity to ISO 527 is 100 MPa or more.

[10] A method for producing the thermoplastic resin composition described in any one of [1] to [9], the method including feeding a pitch-based carbon fiber (B) having a mass average fiber length of 2 mm or longer and 20 mm or shorter to a thermoplastic resin (A) in a molten state.

[11] A molded body obtained by molding the thermoplastic resin composition described in any one of [1] to [9].

[12] A method for producing a molded body, the method including injection-molding a thermoplastic resin composition obtained by the production method described in [10].

Effect of the Invention

The invention intended to provide a thermoplastic resin composition which provides a molded body exhibiting excellent thermal conductivity and mechanical properties.

Mode(S) for Carrying Out the Invention (Thermoplastic Resin (A))

The thermoplastic resin composition of the invention contains a thermoplastic resin (A).

Examples of the thermoplastic resin (A) may include crystalline resins such as a polypropylene resin, a polyamide resin, a polybutylene terephthalate resin, and a polyphenylene sulfide resin; and amorphous resins such as a polycarbonate resin, an ABS resin, and an acrylic resin. These thermoplastic resins (A) may be used singly, or two or more of kinds thereof may be used concurrently. Among these thermoplastic resins (A), a crystalline resin is preferable, a polyamide resin and a polyphenylene sulfide resin are more preferable, and a polyamide resin is still more preferable from the viewpoint of excellent mechanical properties and heat resistance of a molded body of the thermoplastic resin composition.

Examples of the polyamide resin may include nylon 6, nylon 66, nylon 69, nylon 610, nylon 612, nylon 46, nylon 11, nylon 12, poly(hexamethylene terephthalamide), poly (hexamethylene isophthalamide), and poly(m-xylene adipamide). These polyamide resins may be used singly, or two or more kinds thereof may be used concurrently. Among these polyamide resins, nylon 6, nylon 66, and poly(m-xylene adipamide) are preferable and poly(m-xylene adipamide) is more preferable from the viewpoint of excellent moldability of the thermoplastic resin composition and excellent mechanical properties of a molded body thereof.

The content rate of the thermoplastic resin (A) in the thermoplastic resin composition is preferably 39% by mass or more and 69% by mass or less, more preferably 43% by mass or more and 65% by mass or less, and still more preferably 47% by mass or more and 61% by mass or less in 100% by mass of the thermoplastic resin composition. The thermoplastic resin composition exhibits excellent moldability when the content rate of the thermoplastic resin (A) in the thermoplastic resin composition is 39% by mass or more. In addition, the pitch-based carbon fiber (B) and the graphite (C) can be sufficiently blended and thus a molded body of the thermoplastic resin composition exhibits excellent thermal conductivity when the content rate of the thermoplastic resin (A) in the thermoplastic resin composition is 69% by mass or less.

(Pitch-Based Carbon Fiber (B))

The thermoplastic resin composition of the invention contains a pitch-based carbon fiber (B).

A pitch-based carbon fiber means an aggregate of fibers which are produced by spinning a resin which is produced by treating a mesophase pitch, namely, petroleum tar, coal tar, or the like and has a partially liquid crystal structure or an artificially synthesized mesophase pitch, infusibilizing the spun fiber, and carbonizing the infusibilized fiber, have a graphite crystal structure highly developed in the fiber axis direction, and include a filament fiber substantially composed only of carbon as a main component.

The pitch-based carbon fiber exhibits an excellent effect of imparting thermal conductivity. In addition, pitch-based carbon fibers have advantages such as a high modulus of elasticity and a low coefficient of thermal expansion.

Examples of the form of the pitch-based carbon fiber (B) may include a long fiber, a chopped fiber, and a milled fiber. These forms of pitch-based carbon fibers (B) may be used singly, or two or more kinds thereof may be used concurrently. Among these forms of pitch-based carbon fibers (B), a chopped fiber is preferable from the viewpoint that the pitch-based carbon fiber (B) exhibits excellent handleability and the mass average fiber length thereof can be easily controlled.

Examples of commercially available products of the pitch-based carbon fiber (B) may include long fiber series of DIALEAD (trade name, manufactured by Mitsubishi Plastics, Inc.) such as K63712 (tensile modulus of elasticity: 640 GPa, thermal conductivity: 140 W/mK) and K13312 (tensile modulus of elasticity: 420 GPa); chopped fiber series of DIALEAD (trade name, manufactured by Mitsubishi Plastics, Inc.) such as K223SE (tensile modulus of elasticity: 185 GPa, thermal conductivity: 20 W/mK), K223Y1 (tensile modulus of elasticity: 50 GPa, thermal conductivity: less than 5 W/mK), K22311E (tensile modulus of elasticity: 900 GPa, thermal conductivity: 550 W/mK), and K6371T (tensile modulus of elasticity: 640 GPa, thermal conductivity: 140 W/mK); and milled fiber series such as K223HM (tensile modulus of elasticity: 900 GPa, thermal conductivity: 550 W/mK) and K6371M (tensile modulus of elasticity: 640 GPa, thermal conductivity: 140 W/mK).

The diameter of the pitch-based carbon fiber (B) is preferably 4 μm or more and 15 μm or less and more preferably 8 μm or more and 12 μm or less. A carbon fiber can be easily produced when the diameter of the pitch-based carbon fiber (B) is 4 μm or more. In addition, excellent handleability is exhibited when the diameter of the pitch-based carbon fiber (B) is 15 μm or less.

Incidentally, in the present specification, the diameter of the pitch-based carbon fiber (B) is an average value obtained when the thermoplastic resin composition or a molded body thereof is heated at 600° C. for 3 hours in an air atmosphere to remove the thermoplastic resin (A) and the like by thermal decomposition, the diameter of remaining ten pitch-based carbon fibers (B) is measured using an electron microscope, and the diameters thus measured are averaged. The diameter of the pitch-based carbon fiber (B) is the maximum Feret diameter of the filament fibers constituting the pitch-based carbon fiber (B).

The content rate of the pitch-based carbon fiber (B) in the thermoplastic resin composition is preferably 30% by mass or more and 60% by mass or less, more preferably 32% by mass or more and 55% by mass or less, and still more preferably 34% by mass or more and 50% h mass or less in 100% by mass of the thermoplastic resin composition. The molded body of the thermoplastic resin composition exhibits excellent thermal conductivity when the content rate of the pitch-based carbon fiber (B) in the thermoplastic resin composition is 30% by mass or more. In addition, the thermoplastic resin composition exhibits excellent moldability when the content rate of the pitch-based carbon fiber (B) in the thermoplastic resin composition is 60% by mass or less.

(Graphite (C))

The thermoplastic resin composition of the invention contains graphite (C).

Examples of the graphite (C) may include scaly graphite, artificial graphite, and expanded graphite. These graphites (C) may be used singly, or two or more kinds thereof may be used concurrently. Among these graphites (C), expanded graphite is preferable, and expanded graphite after expansion is more preferable from the viewpoint of exhibiting excellent dispersibility in the thermoplastic resin composition.

The content rate of the graphite (C) in the thermoplastic resin composition is 1% by mass or more and 20% by mass or less, preferably 2% by mass or more and 12% by mass or less, more preferably 3% by mass or more and 8% by mass or less in 100% by mass of the thermoplastic resin composition. A molded body of the thermoplastic resin composition exhibits excellent thermal conductivity when the content rate of the graphite (C) in the thermoplastic resin composition is 1% by mass or more. In addition, when the content rate of the graphite (C) in the thermoplastic resin composition is 20% by mass or less, it is possible to blend even expanded graphite after expansion, which is a bulky powder, without deteriorating the productivity and to suppress falling off of the graphite (C) from the molded body.

The total content rate of the pitch-based carbon fibers (B) and graphite (C) in the thermoplastic resin composition is preferably 31% by mass or more and 61% by mass or less, more preferably 34% by mass or more and 57 mass % or less, and still more preferably 37% by mass or more and 53% by mass or less in 100% by mass of the thermoplastic resin composition. A molded body of the thermoplastic resin composition exhibits excellent thermal conductivity when the total content rate of the pitch-based carbon fiber (B) and graphite (C) in the thermoplastic resin composition is 31% by mass or more. In addition, the thermoplastic resin composition exhibits excellent moldability when the total content rate of the pitch-based carbon fiber (B) a graphite (C) in the thermoplastic resin composition is 61% by mass or less.

In addition to the thermoplastic resin (A), the pitch-based carbon fiber (B), and the graphite (C), the thermoplastic resin composition of the invention may contain a PAN-based carbon fiber (D) and other additives (E) if necessary.

The PAN-based carbon fiber (D) means an aggregate of fibers which are produced by infusibilizing a fiber composed of a polyacrylonitrile-based resin obtained by polymerizing acrylonitrile as a main component and further carbonizing the infusibilized fiber and include a filament fiber substantially composed only of carbon as a main component.

PAN-based carbon fibers exhibit an excellent effect of imparting mechanical properties.

Examples of the form of the PAN-based carbon fiber (D) may include a long fiber, a chopped fiber, and a milled fiber. These forms of PAN-based carbon fibers (D) may be used singly, or two or more kinds thereof may be used concurrently. Among these forms of PAN-based carbon fibers (D), a chopped fiber is preferable from the viewpoint that the PAN-based carbon fiber (D) exhibits excellent handleability and the mass average fiber length thereof can be easily controlled.

Examples of commercially available products of the PAN-based carbon fiber (D) may include chopped fiber series of PYROFIL (trade name, manufactured by Mitsubishi Rayon Co., Ltd.) such as TR06U, TR06UL, TR06NE, TR06NL, MR06NE, and MR03NE.

The diameter of the PAN-based carbon fiber (D) is preferably from 1 µm to 20 µm, more preferably from 4 µm to 15 µm, and still more preferably from 5 µm to 8 µm. The specific surface area of the PAN-based carbon fiber (D) can be decreased and excellent moldability into a resin pellet is exhibited when the diameter of the PAN-based carbon fiber (D) is 1 µm or more. In addition, when the diameter of the PAN-based carbon fiber (D) is 20 µm or less, excellent handleability is exhibited, the aspect ratio of the PAN-based carbon fiber (D) can be increased, and a molded body of the thermoplastic resin composition exhibits excellent mechanical properties.

Incidentally, in the present specification, the diameter of the PAN-based carbon fiber (D) is an average value obtained when the thermoplastic resin composition or a molded body thereof is heated at 600° C. for 3 hours in an air atmosphere to remove the thermoplastic resin (A) and the like by thermal decomposition, the diameter of remaining ten PAN-based carbon fibers (D) is measured using an electron microscope, and the diameters thus measured are averaged. The diameter of the PAN-based carbon fiber (D) is the maximum Feret diameter of the filament fibers constituting the PAN-based carbon fiber (D).

The content rate of the PAN-based carbon fiber (D) in the thermoplastic resin composition is preferably 0% by mass or more and 30% by mass or less, more preferably 1% by mass or more and 20% by mass or less, and still more preferably 2% by mass or more and 15% by mass or less in 100% by mass of the thermoplastic resin composition. A molded body of the thermoplastic resin composition exhibits excellent mechanical properties when the content rate of the PAN-based carbon fiber (D) is 1% by mass or more. In addition, the thermoplastic resin composition exhibits excellent moldability when the content rate of the PAN-based carbon fiber (D) is 30% by mass or less.

Examples of the other additives (E) may include a colorant, an antioxidant, a metal deactivator, carbon black, a nucleating agent, a release agent, a lubricant, an antistatic agent, a light stabilizer, an ultraviolet absorber, a PAN-based carbon fiber, a glass fiber, an inorganic filler, an impact modifier, a melt tension improver, a flame retardant, and a plasticizer. These other additives (E) may be used singly, or two or more kinds thereof may be used concurrently.

The content rate of the other additives (E) in the thermoplastic resin composition is preferably 0% by mass or more and 20% by mass or less, more preferably 0% by mass or more and 10% by mass or less, and still more preferably 0% by mass or more and 5% by mass or less in 100% by mass of the thermoplastic resin composition from the viewpoint of not impairing the original performance of the thermoplastic resin composition and a molded body thereof.

(Thermoplastic Resin Composition)

The pitch-based carbon fiber (B) and the graphite (C) both have a high thermal conductivity, but it is easier to form a thermal conduction path and it is possible to obtain a thermoplastic resin composition having a higher thermal conductivity as both the pitch-based carbon fiber (B) and the graphite (C) are blended into the thermoplastic resin composition.

It is considered that it is required to increase the content rate and mass average fiber length of the pitch-based carbon fiber (B) in a case in which a high thermal conductivity is achieved only by the pitch-based carbon fiber (B) without blending the graphite (C), but the pitch-based carbon fiber (B) is likely to be broken and the molding method and the like are greatly limited when producing the thermoplastic resin composition or a molded body thereof.

In addition, it is considered that it is required to increase the content rate of the graphite (C) in a case in which a high thermal conductivity is achieved only by the graphite (C) without blending the pitch-based carbon fiber (B), but the thermoplastic resin composition having a high content rate of the graphite (C) has a high viscosity and thus exhibits poor moldability.

The mass average fiber length of the pitch-based carbon fiber (B) in the thermoplastic resin composition is preferably 0.1 mm or longer and 0.3 mm or shorter and more preferably 0.12 mm or longer and 0.2 mm or shorter. A molded body of the thermoplastic resin composition exhibits excellent mechanical properties and thermal conductivity when the mass average fiber length of the pitch-based carbon fiber (B) in the thermoplastic resin composition is 0.1 mm or longer. In addition, the pitch-based carbon fiber (B) is likely to be filled to the fine end portion of the molded body when the mass average fiber length of the pitch-based carbon fiber (B) in the thermoplastic resin composition is 0.3 mm or shorter.

Incidentally, in the present specification, the mass average fiber length of the pitch-based carbon fiber (B) is an average value obtained when the thermoplastic resin composition or a molded body thereof is heated at 600° C. for 3 hours in an air atmosphere to remove the thermoplastic resin (A) and the like by thermal decomposition, the fiber length of remaining 100 pitch-based carbon fibers (B) is measured using an electron microscope, and the fiber lengths thus measured are averaged. The mass average fiber length is calculated by the following Equation (1), where the fiber length is denoted as L.

$$\text{Mass average fiber length} = \Sigma L^2 / \Sigma L \quad (1)$$

The mass average fiber length of the PAN-based carbon fiber (D) in the thermoplastic resin composition is preferably 0.1 mm or longer and 0.9 mm or shorter and more preferably 0.12 mm or longer and 0.25 mm or shorter. A molded body of the thermoplastic resin composition exhibits excellent mechanical properties when the mass average fiber length of the PAN-based carbon fiber (D) in the thermoplastic resin composition is 0.1 mm or longer. In addition, the pitch-based carbon fiber (B) is likely to be filled to the fine portion of the molded body when the PAN-based carbon fiber (D) in the thermoplastic resin composition is 0.9 mm or shorter.

Incidentally, in the present specification, the mass average fiber length of the PAN-based carbon fiber (D) is an average value obtained when the thermoplastic resin composition or a molded body thereof is heated at 600° C. for 3 hours in an air atmosphere to remove the thermoplastic resin (A) and the like by thermal decomposition, the fiber length of remaining 100 PAN-based carbon fibers (D) is measured using an electron microscope, and the fiber lengths thus measured are averaged. The mass average fiber length is calculated by Equation (1) above, where the fiber length is denoted as L.

The melt volume rate (MVR) of the thermoplastic resin composition is preferably 3 $cm^3$/10 minutes or more and 80 $cm^3$/10 minutes or less and more preferably 5 $cm^3$/10 minutes or more and 30 $cm^3$/10 minutes or less from the viewpoint of excellent moldability of the thermoplastic resin composition.

Incidentally, in the present specification, the melt volume rate (MVR) is a value measured at 300° C. and 21 N when the thermoplastic resin (A) is a polyamide resin, at 250° C. and 21 N when the thermoplastic resin (A) is a polybutylene terephthalate resin, at 330° C. and 21 N when the thermoplastic resin (A) is a polyphenylene sulfide resin, at 300° C. at 21 N when the thermoplastic resin (A) is a polycarbonate resin, and in conformity to ISO 1133-1 Annex B Table 1 when the thermoplastic resin (A) is another resin.

The thermal conductivity of the thermoplastic resin composition is preferably 10 W/mK or more and 50 W/mK or less and more preferably 12 W/mK or more and 30 W/mK or less. The thermoplastic resin composition exhibits excellent thermal conductivity and it is possible to avoid a molded body thereof from locally having a high temperature when the thermal conductivity of the thermoplastic resin composition is 10 W/mK or more. In addition, it is possible to keep the content rates of the pitch-based carbon fibers (B) and graphite (C) low and a molded body of the thermoplastic resin composition exhibits excellent mechanical properties when the thermal conductivity of the thermoplastic resin composition is 50 W/mK or less.

Incidentally, in the present specification, the thermal conductivity of the thermoplastic resin composition is a value measured by a hot wire method. Specifically, the thermoplastic resin composition is injection-molded to obtain a molded body having a thickness of 1 mm and the molded body is subjected to the measurement using a thermal conductivity meter. In the case of using a box type probe, the thermal conductivity of the molded body can be calculated from the results obtained when the measurement is conducted by superposing a reference plate having a plurality of known thermal conductivities, the molded body, and the box type probe in this order such that the flow direction of the molded body in injection molding is orthogonal to the hot wire.

(Method for Producing Thermoplastic Resin Composition)

Examples of the method for producing a thermoplastic resin composition may include a method in which the thermoplastic resin (A), the pitch-based carbon fiber (B), and the graphite (C) are dry blended and then melt-kneaded; a method in which the pitch-based carbon fiber (B) and the graphite (C) are fed to the thermoplastic resin (A) in a molten state; and a method in which the thermoplastic resin (A) and the graphite (C) are dry blended, the thermoplastic resin (A) is then melted, and the pitch-based carbon fiber (B) is fed to the thermoplastic resin (A) in a molten state.

A method in which the pitch-based carbon fiber (B) and the graphite (C) are fed to the thermoplastic resin (A) in a molten state and a method in which the thermoplastic resin (A) and the graphite (C) are dry blended, the thermoplastic resin (A) is then melted, and the pitch-based carbon fiber (B) is fed to the thermoplastic resin (A) in a molten state are preferable particularly from the viewpoint that the dispersibility and mass average fiber length of the pitch-based carbon fiber (B) can be controlled and a molded body of the thermoplastic resin composition exhibits excellent mechanical properties and thermal conductivity. Specifically, the thermoplastic resin (A) may be fed through the main feeder installed at the upstream side of the extruder and melt-kneaded and then the pitch-based carbon fiber (B) may be fed through a side feeder installed at the downstream side of the extruder.

In addition, in the case of blending the PAN-based carbon fiber (D), it is preferable to feed the thermoplastic resin (A) through the main feeder installed at the upstream side of the extruder, to melt-knead the thermoplastic resin (A), and then to feed the PAN-based carbon fiber (D) through the first side feeder installed at the downstream side of the extruder and the pitch-based carbon fiber (B) through the second side feeder installed at the downstream side of the first side feeder.

The fiber length of the pitch-based carbon fiber (B) to be used in the production of the thermoplastic resin composition is preferably 2 mm or longer and 20 mm or shorter, more preferably 3 mm or longer and 10 mm or shorter, and still more preferably 5 mm or longer and 8 mm or shorter from the viewpoint of being easy to feed the pitch-based carbon fiber (B) in a fixed amount.

The mass average fiber length of the pitch-based carbon fiber (B) in the thermoplastic resin composition described above and the mass average fiber length of the pitch-based carbon fiber (B) in the molded body to be described later can be adjusted by controlling the melt kneading conditions such as the feeding method of the pitch-based carbon fiber (B), the screw rotation number, and the extrusion output.

For melt kneading for the production of the thermoplastic resin composition, an extruder may be used.

Examples of the extruder may include a single screw extruder and a twin screw extruder, and a twin screw extruder is preferable.

In the case of a co-rotating twin screw extruder, the screw rotation number of the extruder is preferably 100 rpm or more and 300 rpm or less. The pitch-based carbon fiber (B) exhibits excellent dispersibility when the screw rotation number of the extruder is 100 rpm or more. In addition, breakage of the pitch-based carbon fiber (B) can be suppressed when the screw rotation number of the extruder is 300 rpm or less, In the case of a method in which the pitch-based carbon fiber (B) is fed to the thermoplastic resin (A) in a molten state, the screw of the extruder is preferably provided with one or more kneading zones before and after feeding the pitch-based carbon fiber (B), respectively. In other words, the thermoplastic resin (A) is sufficiently melt-kneaded in the kneading zone before being fed with the pitch-based carbon fiber (B) and the thermoplastic resin (A) in a molten state and the pitch-based carbon fiber (B) are kneaded in the kneading zone after being fed with the pitch-based carbon fiber (B). This makes it possible to control the dispersibility and mass average fiber length of the pitch-based carbon fiber (B).

The temperature for melt kneading may be set to a temperature equal to or higher than the inciting point of the thermoplastic resin (A) and equal to or lower than the thermal decomposition temperature of the thermoplastic resin (A), and it is preferably 200° C. or higher and 350° C. or lower. It is possible to decrease the shear stress applied to the pitch-based carbon fiber (B) and a molded body of the thermoplastic resin composition exhibits excellent mechanical properties when the temperature for melt kneading is 200° C. or higher. In addition, it is possible to suppress thermal decomposition of the thermoplastic resin (A) and a molded body of the thermoplastic resin composition exhibits excellent mechanical properties when the temperature for melt kneading is 350° C. or lower.

The molded body of the invention contains the thermoplastic resin of the invention.

The molded body of the invention can be obtained by molding the thermoplastic resin of the invention.

Examples of the molding method may include injection molding and press molding, and injection molding is preferable.

The mass average fiber length of the pitch-based carbon fiber (B) in the molded body is preferably 0.1 mm or longer and 0.3 mm or shorter and more preferably 0.11 mm or longer and 0.19 mm or shorter. The molded body exhibits excellent mechanical properties and thermal conductivity when the mass average fiber length of the pitch-based carbon fiber (B) in the molded body is 0.1 mm or longer. In addition, the pitch-based carbon fiber (B) is likely to be filled to the fine end portion of the molded body when the mass average fiber length of the pitch-based carbon fiber (B) in the molded body is 0.3 mm or shorter.

Generally, the mass average fiber length in the molded body is shorter than the mass average fiber length in the thermoplastic resin composition because of breakage of the pitch-based carbon fiber (B) at the time of molding.

The maintenance factor of the mass average fiber length is preferably 50% or more and 100% or less, more preferably 70% or more and 98% or less, and still more preferably 90% or more and 95% or less from the viewpoint of having a small change in mechanical properties and thermal conductivity of the molded body even when the molded body is repeatedly molded or recycled.

The flexural strength of the molded body is preferably 150 MPa or more and 700 MPa or less and more preferably 200 MPa or more and 500 MPa or less from the viewpoint of being able to thin the molded body.

The flexural modulus of elasticity of the molded body is preferably 20 GPa or more and 70 GPa or less and more preferably 30 GPa or more and 60 GPa or from the viewpoint of being able to thin the molded body.

Incidentally, in the present specification, the flexural strength and flexural modulus of elasticity of the molded body are values measured in conformity to ISO 178.

The Charpy impact strength of a molded body with a notch is preferably 2.0 kJ/m$^2$ or more and 20 kJ/m$^2$ or less and more preferably 3.0 kJ/m$^2$ or more and 15 kJ/m$^2$ or less from the viewpoint of obtaining a molded body which hardly cracks.

The Charpy impact strength of a molded body without a notch is preferably 10 kJ/m$^2$ or more and 80 kJ/m$^2$ or less and more preferably 15 kJ/m$^2$ or more and 50 kJ/m$^2$ or less from the viewpoint of obtaining a molded body which hardly cracks.

Incidentally, in the present specification, the Charpy impact strength of the molded body is a value measured in conformity to ISO 179. In addition, the notch is a V notch.

The tensile strength of the molded body is preferably 100 MPa or more and 300 MPa or less and more preferably 150 MPa or more and 200 MPa or less from the viewpoint of obtaining a molded body which hardly cracks.

Incidentally, in the present specification, the tensile strength of the molded body is a value measured in conformity to ISO 527.

The molded body of the invention can be suitably used in an in-vehicle camera housing, a housing of an electronic device, a high-intensity lamp part, a high-speed driving gear, and the like and particularly suitably in an in-vehicle camera housing since it exhibits excellent mechanical properties and thermal conductivity.

EXAMPLES

Hereinafter, the invention will be specifically described with reference to Examples, but the invention is not limited to these Examples.

(Measurement of Thermal Conductivity)

The thermoplastic resin compositions obtained in Examples and Comparative Examples were injection-molded under the conditions of a cylinder temperature of 300° C. and a mold temperature of 80° C. using an injection molding machine (model name "IS55" manufactured by TOSHIBA MACHINE CO., LTD.) to obtain molded bodies (width: 100 mm, length: 100 mm, thickness: 1 mm).

The molded body thus obtained and the box type probe were superposed on a reference plate having a known thermal conductivity in this order such that the fine wire which was a heat source of the box type probe was orthogonal to the flow direction of the molded body in injection molding, and the measurement was conducted using a rapid thermal conductivity meter (model name "QTM-500" manufactured by KYOTO ELECTRONICS MANUFACTURING CO., LTD.).

The thermal conductivity of the molded body was calculated by interpolating the results obtained when the measurement was conducted using a plurality of reference plates so that the difference from the reference plate became zero.

(Measurement of Melt Volume Rate (MVR))

The melt volume rate (MVR) of the thermoplastic resin compositions obtained in Examples and Comparative Examples was measured in conformity to ISO 1133-1 using a melt flow index tester (model name "LABO-MI" manufactured by YASUDA SEIKI SEISAKUSHO, LTD.).

Incidentally, the melt volume rate was measured at 300° C. and 21 N for a thermoplastic resin composition using a thermoplastic resin (A-1) which was a polyamide resin, at 330° C. and 21 N for a thermoplastic resin composition using a thermoplastic resin (A-2) which was a polyphenylene sulfide resin, and at 230° C. and 21 N for a thermoplastic resin composition using a thermoplastic resin (A-3) which was a polypropylene resin.

(Measurement of Flexural Strength and Flexural Modulus of Elasticity)

The thermoplastic resin compositions obtained in Examples and Comparative Examples were injection-molded under the conditions of a cylinder temperature of 300° C. and a mold temperature of 80° C. using an injection molding machine (model name "IS55" manufactured by TOSHIBA MACHINE CO., LTD.) to obtain molded bodies (width: 10 mm, length: 80 mm, thickness: 4 mm). The molded bodies thus obtained were subjected to a three-point bending test in conformity to ISO 178 to measure the flexural strength and flexural modulus of elasticity.

(Measurement of Charpy Impact Strength)

The thermoplastic resin compositions obtained in Examples and Comparative Examples were injection-molded under the conditions of a cylinder temperature of 300° C. and a mold temperature of 80° C. using an injection molding machine (model name "IS55" manufactured by TOSHIBA MACHINE CO., LTD.) to obtain molded bodies (width: 10 mm, length: 80 mm, thickness: 4 mm). The molded bodies thus obtained were subjected to a Charpy impact test in conformity to ISO 179 to measure the Charpy impact strength of the molded bodies without a notch. In addition, a V notch was imparted to the molded bodies thus obtained, and the molded bodies were subjected to a Charpy impact test in conformity to ISO 179 to measure the Charpy impact strength of the molded bodies with a notch.

(Measurement of Tensile Strength)

The thermoplastic resin compositions obtained in Examples and Comparative Examples were injection-molded under the conditions of a cylinder temperature of 300° C. and a mold temperature of 80° C. using an injection molding machine (model name "IS55" manufactured by TOSHIBA MACHINE CO., LTD.) to obtain dumbbell-shaped molded bodies (width: 10 mm, length: 80 mm, thickness: 4 mm). The molded bodies thus obtained were subjected to a tension test in conformity to ISO 527 to measure the tensile strength.

(Measurement of Mass Average Fiber Length)

The thermoplastic resin compositions obtained in Examples and Comparative Examples were heated at 600° C. for 3 hours in an air atmosphere to remove the thermoplastic resin (A) and the like by thermal decomposition, and the fiber length of remaining arbitrary 100 carbon fibers was measured using an optical microscope to calculate the mass average fiber length.

The thermoplastic resin compositions obtained in Examples and Comparative Examples were injection-molded wider the conditions of a cylinder temperature of 300° C. and a mold temperature of 80° C. using an injection molding machine (model name "IS55" manufactured by TOSHIBA MACHINE CO., LTD.) to obtain molded bodies width: 10 mm, length: 80 mm, thickness: 4 mm). The molded bodies thus obtained were heated at 600° C. for 3 hours in an air atmosphere to remove the thermoplastic resin (A) and the like by thermal decomposition, and the fiber length of remaining arbitrary 100 carbon fibers was measured using an optical microscope to calculate the mass average fiber length.

(Raw Materials)

Thermoplastic resin (A-1): a resin composition in which 88% by mass of a polyamide resin (poly(m-xylene adipamide) (trade name "MX nylon 6007" manufactured by MITSUBISHI GAS CHEMICAL COMPANY, INC.), 10% by mass of nylon 66 (trade name "E2000SL-1" manufactured by UNITIKA LTD.), and 2% by mass of other additives (including a release agent, a nucleating agent, and carbon black) are blended.

Thermoplastic resin (A-2): polyphenylene sulfide resin (trade name "DSP C-115" crosslinked polyphenylene sulfide resin manufactured by DIC Corporation)

Thermoplastic Resin (A-3): a resin composition in which 95% of a polypropylene resin (trade name "NOVATEC-PP MA04A" manufactured by Japan Polypropylene Corporation) and 5% of a modified polypropylene resin (trade name "UMEX 1001" manufactured by Sanyo Chemical Industries, Ltd.) are blended.

Thermoplastic resin (A-4): polybutylene terephthalate resin (trade name "NOVADURAN 5008" manufactured by Mitsubishi Engineering-Plastics Corporation)

Thermoplastic resin (A-5): a resin composition in which 75.9% by mass of a polycarbonate resin (trade name "NOVAREX. 7020IR" manufactured by Mitsubishi Engineering-Plastics Corporation), 19.0% by mass of a polybutylene terephthalate resin (trade name "NOVADURAN 5008" manufactured by Mitsubishi Engineering-Plastics Corporation), 4.7% by mass of an impact modifier (trade name "METABLEN S2006" manufactured by Mitsubishi Rayon Co., Ltd.), and 0.4% by mass of an antioxidant are blended.

Pitch-based carbon fiber (B-1): pitch-based carbon fiber (trade name "DIALEAD K6371T" manufactured by Mitsubishi Plastics, Inc., fiber length: 6 mm, thermal conductivity: 140 W/mK, tensile modulus of elasticity: 640 GPa, tensile strength: 2600 MPa)

Pitch-based carbon fiber (B-2): pitch-based carbon fiber (trade name "DIALEAD K223HE" manufactured by Mitsubishi Plastics, Inc., fiber length: 6 mm, thermal conductivity: 550 W/mK, tensile modulus of elasticity: 900 GPa, tensile strength: 3800 MPa)

Pitch-based carbon fiber (B-3): pitch-based carbon fiber (trade name "DIALEAD K237SE" manufactured by Mitsubishi Plastics, Inc., fiber length: 6 mm, thermal conductivity: 140 W/mK, tensile modulus of elasticity: 640 GPa, tensile strength: 2600 MPa)

Graphite (C-1): expanded graphite (trade name "GRAFOIL Powder GFP-100" manufactured by GrafTech International LID, pulverized product of expanded graphite sheet, average particle diameter: 0.1 mm)

PAN-based carbon fiber (D-1): (trade name "PYROFIL TR06NL" manufactured by Mitsubishi Rayon Co., Ltd., fiber length: 6 mm, tensile modulus of elasticity: 230 GPa or more, tensile strength: 3720 MPa or more)

PAN-based carbon fiber (D-2): (trade name "PYROFIL TR06UL" manufactured by Mitsubishi Rayon Co., Ltd., fiber length: 6 mm, tensile modulus of elasticity: 230 GPa or more, tensile strength: 3720 MPa or more)

Example 1

Using a co-rotating twin screw extruder (model name "TEX44αII" manufactured by The Japan Steel Works, LTD.) having a main raw material feeder and a side feeder, 60 parts by mass of the thermoplastic resin (A-1), 35 parts by mass of the pitch-based carbon fiber (B-1), and 5 parts by mass of the graphite (C-1) were melt-kneaded to obtain a thermoplastic resin composition. The evaluation results are presented in Table 2.

Examples 2 to 7 and Comparative Examples 1 to 4

Thermoplastic resin compositions were obtained by conducting the operation in the same manner as in Example 1 except that the composition was changed as presented in Table 1. The evaluation results are presented in Table 2.

Incidentally, in all Examples and Comparative Examples of Examples 1 to 7 and Comparative Examples 1 to 4, the feeders of the extruder were installed such that the main raw material feeder, the side feeder 1, and the side feeder 2 were disposed from the upstream side, and the zones were disposed at four places in total, namely, at two places between the main raw material feeder and the side feeder 1, one place between the side feeder 1 and the side feeder 2, and one place between the side feeder 2 and the die.

In addition, in all Examples and Comparative Examples of Examples 1 to 7 and Comparative Examples 1 to 4, the extrusion conditions were set to have a screw rotation number of 200 rpm and a discharge rate of 80 kg/hour. The cylinder temperature was set to 300° C. when the thermoplastic resin (A) was a polyamide resin and 330° C. when the thermoplastic resin (A) was a polyphenylene sulfide resin.

Furthermore, in all Examples and Comparative Examples of Examples 1 to 7 and Comparative Examples 1 to 4, the thermoplastic resin (A) and the graphite (C) were fed through the main raw material feeder, the pitch-based carbon fiber (B) was fed through the side feeder 2, and the PAN-based carbon fiber (D) was fed through the side feeder 1.

Example 8

Using a co-rotating twin screw extruder (model name "PCM-30" manufactured by Ikegai Corp) having a main raw material feeder and a side feeder, 50 parts by mass of the thermoplastic resin (A-4), 35 parts by mass of the pitch-based carbon fiber (B-3), and 5 parts by mass of the graphite (C-1) were melt-kneaded to obtain a pellet, meanwhile, 50 parts by mass of the thermoplastic resin (A-4), 10 parts by mass of the PAN-based carbon fiber (D-2), and 5 parts by mass of the graphite (C-1) were melt-kneaded to obtain a pellet, and these two kinds of pellets were dry blended at a ratio of 7:2 to obtain a thermoplastic resin composition.

Example 9

Using a co-rotating twin screw extruder (model name "PCM-30" manufactured by Ikegai Corp) having a main raw material feeder and a side feeder, 50 parts by mass of the thermoplastic resin (A-5), 35 parts by mass of the pitch-based carbon fiber (B-3), and 5 parts by mass of the graphite (C-1) were melt-kneaded to obtain a pellet, meanwhile, 50 parts by mass of the thermoplastic resin (A-5), 10 parts by mass of the PAN-based carbon fiber (D-2), and 5 parts by mass of the graphite (C-1) were melt-kneaded to obtain a pellet, and these two kinds of pellets were dry blended at a ratio of 7:2 to obtain a thermoplastic resin composition.

Example 10

Using a co-rotating twin screw extruder (model name "PCM-30" manufactured by Ikegai Corp) having a main raw material feeder and a side feeder, 50 parts by mass of the thermoplastic resin (A-2), 35 parts by mass of the pitch-based carbon fiber (B-3), and 5 parts by mass of the graphite (C-1) were melt-kneaded to obtain a pellet, meanwhile, 50 parts by mass of the thermoplastic resin (A-2), 10 parts by mass of the PAN-based carbon fiber (D-1), and 5 parts by mass of the graphite (C-1) were melt-kneaded to obtain a pellet, and these two kinds of pellets were dry blended at a ratio of 7:2 to obtain a thermoplastic resin composition.

Incidentally, in all Examples of Examples 8 to 10, the feeders of the extruder were installed such that the main raw material feeder and the side feeder were disposed from the upstream side, and the kneading zones were disposed at three places in total, namely, at two places between the main raw material feeder and the side feeder and one place between the side feeder and the die.

In addition, in all Examples, the extrusion conditions were set to have a screw rotation number of 200 rpm and a discharge rate of 15 kg/hour. The cylinder temperature was set to 250° C. when the thermoplastic resin (A) was the polybutylene terephthalate resin (A-4) and 270° C. when the thermoplastic resin (A) was the polycarbonate/polybutylene terephthalate alloy resin (A-5).

Furthermore, in all Examples, the thermoplastic resin (A) and the graphite (C) were fed through the main raw material feeder and the pitch-based carbon fiber (B) and the PAN-based carbon fiber (D) were fed through the side feeder.

TABLE 1

| | Thermoplastic resin (A) | | Pitch-based carbon fiber (B) | | Graphite (C) | | PAN-based carbon fiber (D) | |
|---|---|---|---|---|---|---|---|---|
| | Kind | Content rate (% by mass) | Kind | Content rate (% by mass) | Kind | Content rate (% by mass) | Kind | Content rate (% by mass) |
| Example 1 | (A-1) | 60 | (B-1) | 35 | (C-1) | 5 | — | — |
| Example 2 | (A-1) | 50 | (B-1) | 45 | (C-1) | 5 | — | — |
| Example 3 | (A-1) | 60 | (B-2) | 35 | (C-1) | 5 | — | — |
| Example 4 | (A-1) | 50 | (B-2) | 45 | (C-1) | 5 | — | — |
| Example 5 | (A-2) | 60 | (B-1) | 35 | (C-1) | 5 | — | — |
| Example 6 | (A-1) | 50 | (B-3) | 35 | (C-1) | 5 | (D-1) | 10 |
| Example 7 | (A-3) | 50 | (B-3) | 35 | (C-1) | 5 | (D-2) | 10 |
| Example 8 | (A-4) | 50 | (B-3) | 35 | (C-1) | 5 | (D-2) | 10 |
| Example 9 | (A-5) | 50 | (B-3) | 35 | (C-1) | 5 | (D-2) | 10 |
| Example 10 | (A-2) | 50 | (B-3) | 35 | (C-1) | 5 | (D-1) | 10 |
| Comparative Example 1 | (A-1) | 70 | (B-1) | 25 | (C-1) | 5 | — | — |
| Comparative Example 2 | (A-2) | 60 | — | — | (C-1) | 5 | (D-1) | 35 |
| Comparative Example 3 | (A-2) | 70 | (B-2) | 30 | — | — | — | — |
| Comparative Example 4 | (A-1) | 25 | (B-3) | 35 | (C-1) | 40 | — | — |

TABLE 2

Evaluation results

| | Thermal conductivity (W/mK) | MVR (cm$^3$/10 min) | Flexural strength (MPa) | Flexural modulus of elasticity (GPa) | Charpy impact strength (kJ/m$^2$) when having notch | Charpy impact strength (kJ/m$^2$) when not having notch | Tensile strength (MPa) | Mass average fiber length (mm) of pitch-based carbon fiber (B) in thermoplastic resin composition | Mass average fiber length (mm) of pitch-based carbon fiber (B) in molded body |
|---|---|---|---|---|---|---|---|---|---|
| Example 1 | 13.8 | 8.6 | 231 | 31.9 | 3.7 | 19 | 165 | 0.172 | 0.158 |
| Example 2 | 12.2 | 7.4 | 237 | 35.4 | 3.9 | 19 | 164 | 0.162 | 0.133 |
| Example 3 | 25.6 | 12.7 | 164 | 32.1 | 3.2 | 12 | 116 | 0.152 | 0.113 |
| Example 4 | 26.0 | 7.0 | 180 | 39.4 | 3.1 | 10 | 119 | 0.143 | 0.126 |
| Example 5 | 16.9 | 17.0 | 174 | 29.6 | 2.4 | 11 | 118 | — | — |
| Example 6 | 15.8 | 10.4 | 261 | 38.7 | 4.2 | 18 | 170 | — | — |
| Example 7 | 12.3 | 4.6 | 127 | 21.7 | 4.7 | 18 | 80 | — | — |
| Example 8 | 16.8 | — | 140 | 29.0 | 3.2 | 14 | 78 | — | — |
| Example 9 | 16.7 | — | 164 | 28.1 | 4.1 | 16 | 106 | — | — |
| Example 10 | 17.5 | — | 180 | 34.2 | 2.7 | 10 | 128 | — | — |
| Comparative Example 1 | 6.5 | 10.0 | 204 | 23.2 | 3.7 | 20 | 159 | 0.184 | 0.165 |
| Comparative Example 2 | 4.8 | 0.9 | 275 | 33.4 | 6.5 | 19 | 164 | — | — |
| Comparative Example 3 | 7.3 | 17.5 | 150 | 28.3 | 2.6 | 8 | 99 | — | — |
| Comparative Example 4 | — | — | — | — | — | — | — | — | — |

The thermoplastic resin compositions obtained in Examples 1 to 10 exhibited excellent moldability and molded bodies thereof exhibited excellent mechanical properties and thermal conductivity.

On the other hand, the thermoplastic resin composition obtained in Comparative Example 1 had a low content rate of the pitch-based carbon fiber (B) and a molded body thereof exhibited poor thermal conductivity. In addition, the thermoplastic resin composition obtained in Comparative Example 2 exhibited poor moldability since a PAN-based carbon fiber was used therein instead of the pitch-based carbon fiber (B), and a molded body thereof exhibited poor thermal conductivity. Furthermore, the graphite (C) was not used in the thermoplastic resin composition obtained in Comparative Example 3 and a molded body of the thermoplastic resin composition thus exhibited poor thermal conductivity. In Comparative Example 4, feeding failure occurred in the feeder since the graphite (C) was bulky, and a thermoplastic resin composition was not obtained.

INDUSTRIAL APPLICABILITY

The invention can provide a thermoplastic resin composition which provides a molded body exhibiting excellent thermal conductivity and mechanical properties.

The invention claimed is:

1. A method for producing a thermoplastic resin composition, comprising feeding a pitch-based carbon fiber (B) having a mass average fiber length of 2 mm or longer and 20 mm or shorter to a thermoplastic resin (A) in a molten state,
    wherein the thermoplastic resin composition comprises:
        the thermoplastic resin (A);
        the pitch-based carbon fiber (B);
        graphite (C); and
        a PAN-based carbon fiber (D),
    wherein
        the thermoplastic resin (A) is a polyamide resin,
        a content of the thermoplastic resin (A) is 39% by mass or more and 69% by mass or less with respect to 100% by mass of the thermoplastic resin composition,
        a content of the pitch-based carbon fiber (B) is 30% by mass or more with respect to 100% by mass of the thermoplastic resin composition,
        a mass average fiber length of the pitch-based carbon fiber (B) in the thermoplastic resin composition is 0.1 mm or longer and 0.3 mm or shorter,
        a content of the graphite (C) is 1% by mass or more and 20% by mass or less with respect to 100% by mass of the thermoplastic resin composition,
        a mass average fiber length of the PAN-based carbon fiber (D) in the thermoplastic resin composition is 0.1 mm or longer and 0.9 mm or shorter,
        a content of the PAN-based carbon fiber (D) is 1% by mass or more and 30% by mass or less with respect to 100% by mass of the thermoplastic resin composition, and
    the only resin in the thermoplastic composition is the thermoplastic resin (A).

2. The method according to claim 1, wherein the content of the graphite (C) is 2% by mass or more and 12% by mass or less with respect to 100% by mass of the thermoplastic resin composition.

3. The method according claim 1, wherein a thermal conductivity of the pitch-based carbon fiber (B) is 400 W/mK or less.

4. The method according to claim 1, wherein the thermoplastic resin is poly(m-xylene adipamide).

5. The method according to claim 1, wherein a thermal conductivity of a molded body which is obtained by molding the thermoplastic resin composition and which has a thickness of 1 mm as measured by a hot wire method is 10 W/mK or more.

6. The method according to claim 1, wherein a tensile strength of a molded body obtained by molding the thermoplastic resin composition measured in conformity to ISO 527 is 100 MPa or more.

7. A molded body obtained by molding the thermoplastic resin composition obtained by the method according to claim 1.

8. A method for producing a molded body, the method comprising injection-molding the thermoplastic resin composition obtained by the method according to claim 1.

9. The method according to claim 1, wherein the mass average fiber length of the pitch-based carbon fiber (B) in the thermoplastic resin composition is 0.12 mm or longer and 0.2 mm or shorter.

10. The method according to claim 1, wherein the content of the pitch-based carbon fiber (B) is 32% by mass or more and 55% by mass or less with respect to 100% by mass of the thermoplastic resin composition.

11. The method according to claim 1, wherein the content of the pitch-based carbon fiber (B) is 34% by mass or more and 50% by mass or less with respect to 100% by mass of the thermoplastic resin composition.

12. The method according to claim 1, wherein the content of the graphite (C) is 3% by mass or more and 8% by mass or less with respect to 100% by mass of the thermoplastic resin composition.

13. The method according to claim 1, wherein a content of the thermoplastic resin (A) is 43% by mass or more and 65% by mass or less with respect to 100% by mass of the thermoplastic resin composition.

14. The method according to claim 1, wherein a content of the thermoplastic resin (A) is 47% by mass or more and 61% by mass or less with respect to 100% by mass of the thermoplastic resin composition.

15. The method according to claim 1, wherein a diameter of the pitch-based carbon fiber (B) is 4 μm or more and 15 μm or less.

16. The method according to claim 1, wherein a diameter of the pitch-based carbon fiber (B) is 8 μm or more and 12 μm or less.

17. The method according to claim 1, wherein the polyamide comprises is one selected from the group consisting of nylon 6, nylon 66, nylon 69, nylon 610, nylon 612, nylon 46, nylon 11, nylon 12, poly(hexamethylene terephthalamide), and poly(hexamethylene isophthalamide).

* * * * *